(12) United States Patent
Mazor

(10) Patent No.: US 12,639,637 B2
(45) Date of Patent: May 26, 2026

(54) SYSTEM AND METHOD OF TRAINING MACHINE-LEARNING-BASED MODEL

(71) Applicant: GENESYS CLOUD SERVICES, INC., Menlo Park, CA (US)

(72) Inventor: Igal Mazor, Tel Aviv (IL)

( * ) Notice: Subject to any disclaimer, the term of this patent is extended or adjusted under 35 U.S.C. 154(b) by 796 days.

(21) Appl. No.: 17/962,729

(22) Filed: Oct. 10, 2022

(65) Prior Publication Data

US 2024/0119370 A1     Apr. 11, 2024

(51) Int. Cl.
*G06N 20/20* (2019.01)
*G06F 18/214* (2023.01)

(52) U.S. Cl.
CPC ......... *G06N 20/20* (2019.01); *G06F 18/2148* (2023.01)

(58) Field of Classification Search
CPC .......................... G06F 18/2148; G06N 20/20
See application file for complete search history.

(56) References Cited

PUBLICATIONS

Liu et al., "MESA: Boost Ensemble Imbalanced Learning with MEta-Sampler", Oct. 17, 2020, arXiv:2010.08830v1, pp. 1-19. (Year: 2020).*
Lin et al., "Clustering-based undersampling in class-imbalanced data", May 8, 2017, Information Sciences 409-410 (2017), pp. 17-26. (Year: 2017).*

* cited by examiner

*Primary Examiner* — Brent Johnston Hoover

(57) ABSTRACT

A system and method of training a machine-learning (ML) based model by at least one processor may include receiving an initial dataset, including a plurality of annotated data samples; based on the initial dataset, training at least one ML-based first-level model to perform a first-level task; based on training the at least one ML-based first-level model, calculating at least one characteristic, representing, for each data sample, a value of contribution into a training of a ML-based second-level model to perform a second-level task; omitting a subset of data samples from the initial dataset based on the at least one characteristic, to obtain a target dataset; and training ML-based second-level model, to perform the second-level task, based on the target dataset.

19 Claims, 5 Drawing Sheets

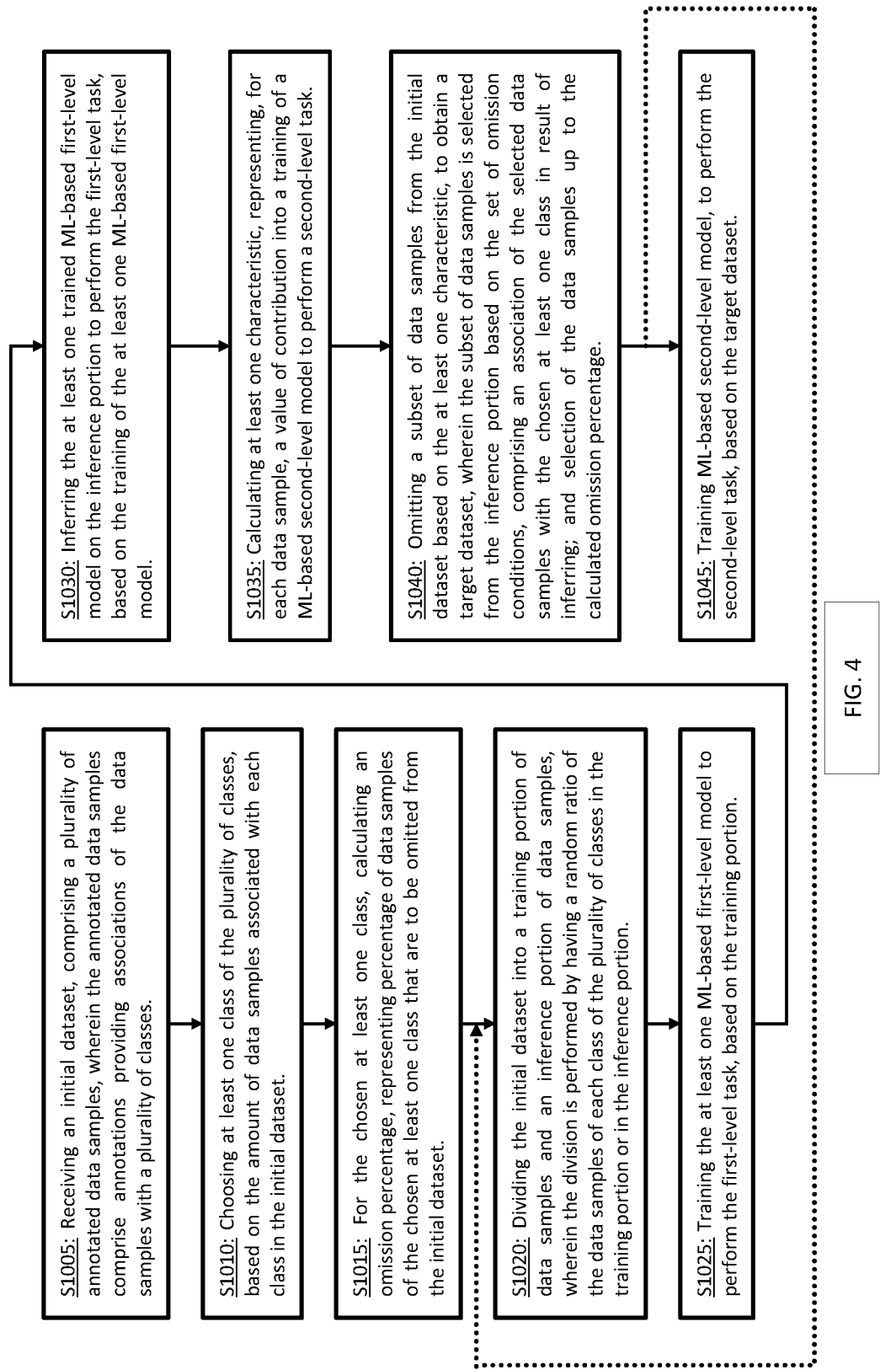

S1005: Receiving an initial dataset, comprising a plurality of annotated data samples, wherein the annotated data samples comprise annotations providing associations of the data samples with a plurality of classes.

S1010: Choosing at least one class of the plurality of classes, based on the amount of data samples associated with each class in the initial dataset.

S1015: For the chosen at least one class, calculating an omission percentage, representing percentage of data samples of the chosen at least one class that are to be omitted from the initial dataset.

S1020: Dividing the initial dataset into a training portion of data samples and an inference portion of data samples, wherein the division is performed by having a random ratio of the data samples of each class of the plurality of classes in the training portion or in the inference portion.

S1025: Training the at least one ML-based first-level model to perform the first-level task, based on the training portion.

S1030: Inferring the at least one trained ML-based first-level model on the inference portion to perform the first-level task, based on the training of the at least one ML-based first-level model.

S1035: Calculating at least one characteristic, representing, for each data sample, a value of contribution into a training of a ML-based second-level model to perform a second-level task.

S1040: Omitting a subset of data samples from the initial dataset based on the at least one characteristic, to obtain a target dataset, wherein the subset of data samples is selected from the inference portion based on the set of omission conditions, comprising an association of the selected data samples with the chosen at least one class in result of inferring; and selection of the data samples up to the calculated omission percentage.

S1045: Training ML-based second-level model, to perform the second-level task, based on the target dataset.

FIG. 4

SYSTEM AND METHOD OF TRAINING MACHINE-LEARNING-BASED MODEL

FIELD OF THE INVENTION

The present invention relates generally to machine learning and artificial intelligence. More specifically, the present invention relates to techniques of preparing training dataset to be used in machine-learning (ML) process.

BACKGROUND OF THE INVENTION

As known, development of mathematical models that can learn from, and make predictions on data is a general purpose of machine learning. In particular, supervised and semi-supervised machine-learning includes model training using so-called "training dataset" (or "supervisory dataset") and testing using "inference dataset". The term "training dataset" is commonly referred to a set of annotated data samples, wherein annotations provide associations of the data samples with a plurality of classes. In other words, annotated data samples represent pairs of input and output vectors (or scalars) for a machine-learning model. The model iteratively analyzes data samples of a training dataset to produce a result, which is then compared with a target result—corresponding annotations of data samples in the training dataset. Based on the comparison, a supervised learning algorithm determines the optimal combinations of variables that will provide the highest prediction reliability. In the end, well-trained model must show sufficiently reliable results when analyzing unknown data.

Consequently, quality of a training data set is reasonably considered a crucial aspect of machine learning. When exploring and analyzing a training dataset for a specific machine-learning task, various issues may be revealed and considered to be fixed.

For example, an unequal distribution of classes within a dataset called data imbalance is considered one of the most common issues of classification machine-learning tasks. When data is highly imbalanced, a trained model will likely suffer from low predictive accuracy of minority classes. There are many methods known from the prior art that are aimed to handling imbalanced classes, for example: random oversampling and under-sampling, Cluster Centroid based Majority Under-sampling Technique (CCMUT), SMOTE (Synthetic Minority Oversampling Technique), applying a higher penalty for misclassifications in the minority class and more.

However, in addition to training dataset quantity issues, there are quality ones as well. As known, different data samples in the same dataset may have different degree of impact on the training process. It is important to find proper data sample combination for a training dataset in order to develop model's ability to generalize and distinguish data correctly. Consequently, when it comes to fixing data imbalance issue by reducing certain amount of data samples from a majority class, it is critical not to lose valuable data samples and keep redundant ones. However, the existing under-sampling techniques either consider poorly or not consider at all the expected contribution of each data sample into the following training process. As a result, ML-based models trained on datasets which are achieved by such methods lack reliability, particularly if considering the contribution into the training process that respective initial datasets can potentially provide.

SUMMARY OF THE INVENTION

Accordingly, there is a need for a system and method of training ML-based model, which would incorporate the improved process of balancing training dataset, thereby increasing training dataset quality and, consequently, increasing reliability of trained ML-based model performance. More specifically, there is a need for creating data balancing method that provides omission of data samples based on evaluation of their expected contribution into the following training process.

To overcome the shortcomings of the prior art, the following invention is provided.

In the general aspect, the invention may be directed to a method of training a machine-learning (ML)-based model by at least one processor, the method including receiving an initial dataset, including a plurality of annotated data samples; based on the initial dataset, training at least one ML-based first-level model to perform a first-level task; based on training the at least one ML-based first-level model, calculating at least one characteristic, representing, for each data sample, a value of contribution into a training of a ML-based second-level model to perform a second-level task; omitting a subset of data samples from the initial dataset based on the at least one characteristic, to obtain a target dataset; and training ML-based second-level model, to perform the second-level task, based on the target dataset.

In another general aspect, the invention may be directed to a system for training an ML-based model, the system including a non-transitory memory device, wherein modules of instruction code are stored, and at least one processor associated with the memory device, and configured to execute the modules of instruction code, whereupon execution of said modules of instruction code, the at least one processor is configured to receive an initial dataset, including a plurality of data samples; based on the initial dataset, train at least one ML-based first-level model to perform a first-level task; based on training the at least one ML-based first-level model, calculate at least one characteristic, representing, for each data sample, a value of contribution into a training of a ML-based second-level model to perform a second-level task; omit a subset of data samples from the initial dataset based on the characteristic, to obtain a target dataset for training the ML-based second-level model to perform the second-level task.

In some embodiments, training the at least one ML-based first-level model, calculating the at least one characteristic and omitting the subset of data samples are performed iteratively.

In some embodiments, the annotated data samples include annotations providing associations of the data samples with a plurality of classes; and the method further includes choosing at least one class of the plurality of classes, based on the amount of data samples associated with each class in the initial dataset.

In some embodiments, the at least one processor is further configured to choose at least one class of the plurality of classes, based on the amount of data samples associated with each class in the initial dataset.

In some embodiments, training the at least one ML-based first-level model includes dividing the initial dataset into a training portion of data samples and an inference portion of data samples; training the at least one ML-based first-level model to perform the first-level task, based on the training portion; inferring the at least one trained ML-based first-level model on the inference portion to perform the first-level task, based on the training of the at least one ML-based first-level model.

In some embodiments, the at least one processor is configured to train the at least one ML-based first-level model by dividing the initial dataset into a training portion of data samples and an inference portion of data samples; training the at least one ML-based first-level model to perform the first-level task, based on the training portion; inferring the at least one trained ML-based first-level model on the inference portion to perform the first-level task, based on the training of the at least one ML-based first-level model.

In some embodiments, the division of the initial dataset into the training portion of data samples and the inference portion of data samples is performed by having a random ratio of the data samples of each class of the plurality of classes in the training portion or in the inference portion.

In some embodiments, the first-level task comprises classification of the data samples of the initial dataset according to the plurality of classes; the at least one characteristic comprises a confidence value representing, in result of the inferring, a pertinence of the one or more data samples of the inference portion with their respective associated classes; and the method further comprises selecting the subset of data samples from the inference portion based on a set of omission conditions, said omission conditions comprising (i) an association of the selected data samples with the chosen at least one class in result of inferring, and (ii) a selection of the data samples based on the calculated confidence value.

In some embodiments, the at least one processor is further configured to select the subset of data samples from the inference portion based on a set of omission conditions, said omission conditions comprising (i) an association of the selected data samples with the chosen at least one class in result of inferring, and (ii) a selection of the data samples based on the calculated confidence value.

In some embodiments, the selection of the data samples based on the calculated confidence value includes the selection of the data samples having (a) a highest-scoring confidence value, and (b) a confidence value that surpasses a predefined threshold.

In some embodiments, the at least one processor is further configured to select the data samples based on the calculated confidence value as having (a) a highest-scoring confidence value, and (b) a confidence value that surpasses a predefined threshold.

In some alternative embodiments, the at least one ML-based first-level model comprises a plurality of ML-based first-level models.

In some alternative embodiments, training at least one ML-based first-level model includes training a plurality of ML-based first-level models; and the selection of the data samples based on the calculated confidence value includes a selection of the data samples based on a function of the calculated confidence values of specific data samples, in the plurality of first-level models.

In yet another alternative embodiments, the first-level task comprises clustering the chosen at least one class and forming, in result of clustering, a set of clusters of the data samples which are associated with the chosen at least one class; the at least one characteristic comprises a distance of the one or more data samples from a centroid of a cluster of the set of clusters to which the one or more data samples pertain, in result of the inferring; and the method further comprises selecting the subset of data samples from the inference portion based on a set of omission conditions, said omission conditions comprising selection of the data samples based on the calculated distance.

In some alternative embodiments, the at least one processor is further configured to select the subset of data samples from the inference portion based on a set of omission conditions, said omission conditions comprising selection of the data samples based on the calculated distance.

In some embodiments, the selection of the data samples based on the calculated distance includes the selection of the data samples having (a) a shortest distance to the centroid of the cluster to which they pertain, (b) a distance that is lower than predefined threshold.

In some alternative embodiments, the selection of the data samples based on the calculated distance includes, for at least one cluster, determination of a range of distances corresponding to the densest distribution of the data samples in the cluster; and selection of at least one data sample having the distance from the determined range.

In some embodiments, the method further includes, for the chosen at least one class, calculating an omission percentage, representing percentage of data samples that are to be omitted from the initial dataset; and selecting the subset of data samples from the inference portion based on the set of omission conditions, including selection of the data samples up to the calculated omission percentage.

In some embodiments, the second-level task includes classification of data samples of an incoming dataset according to the plurality of classes.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a flow diagram, depicting a method of training ML-based model, according to some embodiments.

Figure 1:
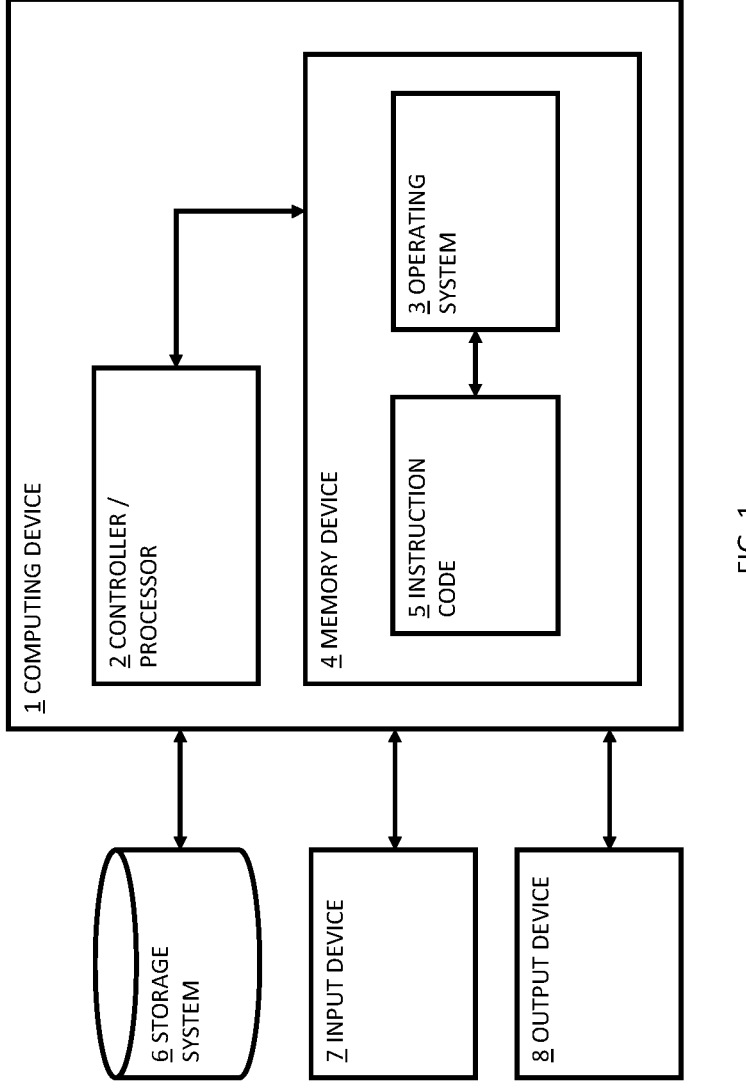
FIG. 1 is a block diagram, depicting a computing device which may be included in the system for training ML-based model, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "choosing", "selecting", "omitting", "training" or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, concurrently, or iteratively and repeatedly.

In some embodiments of the present invention, ML-based model may be an artificial neural network (ANN).

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

It should be obvious for the one ordinarily skilled in the art that various ML-based models can be implemented without departing from the essence of the present invention. It should also be understood, that in some embodiments ML-based model may be a single ML-based model or a set (ensemble) of ML-based models realizing as a whole the same function as a single one. Hence, in view of the scope of the present invention, the abovementioned variants should be considered equivalent.

In some respects, the following description of the claimed invention is provided with respect to the task of fixing imbalanced data issues in training datasets. Imbalance issues occur when annotated datasets have significantly unequal distribution of data samples between designated classes. Such a specific purpose and embodiments of the invention directed to it are provided in order for the description to be sufficiently illustrative and they are not intended to limit the scope of protection claimed by the invention. It should be understood for one ordinarily skilled in the art that the implementation of the claimed invention in accordance with such a task is provided as a non-exclusive example and other practical implementations can be covered by the claimed invention, such as any implementations utilizing the claimed method of omitting data samples regardless to whether the purpose of such omission is to fix imbalanced data issue or different.

As known, artificial intelligence and machine learning techniques are ubiquitously implemented since they turn out to be an indispensable tool for solving tasks where the connection and dependency between the input data and target output data are complex and uncertain. Accordingly, the suggested invention incorporates the use of ML techniques for evaluating the expected contribution of each data sample of an annotated dataset into the following training process. The claimed invention thereby suggests an approach to define subset of the data samples in a training dataset which are to some extent redundant and hence may be reasonably omitted. Consequently, such incorporation of ML techniques into the process of preparing a training dataset provides the achievement of an improved technical effect by increasing training dataset quality and, accordingly, increasing reliability of trained ML-based model performance.

Reference is now made to FIG. 1, which is a block diagram depicting a computing device, which may be included within an embodiment of the system for training ML-based model, according to some embodiments.

Computing device 1 may include a processor or controller 2 that may be, for example, a central processing unit (CPU) processor, a chip or any suitable computing or computational device, an operating system 3, a memory device 4, instruction code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to instruction code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory device 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory device 4 may be or may include a plurality of possibly different memory units. Memory device 4 may be a computer or processor non-transitory readable medium, or a computer non-transitory storage medium, e.g., a RAM. In one embodiment, a non-transitory storage medium such as memory device 4, a hard disk drive, another storage device, etc. may store instructions or code which when executed by a processor may cause the processor to carry out methods as described herein.

Instruction code 5 may be any executable code, e.g., an application, a program, a process, task, or script. Instruction code 5 may be executed by processor or controller 2 possibly under control of operating system 3. For example, instruction code 5 may be a standalone application or an API module that may be configured to train ML-based model as further described herein. Although, for the sake of clarity, a single item of instruction code 5 is shown in FIG. 1, a system according to some embodiments of the invention may include a plurality of executable code segments or modules similar to instruction code 5 that may be loaded into memory device 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Various types of input and output data may be stored in storage system 6 and may be loaded from storage system 6 into memory device 4 where it may be processed by processor or controller 2. In some embodiments, some of the components shown in FIG. 1 may be omitted. For example, memory device 4 may be a non-volatile memory having the storage capacity of storage system 6. Accordingly, although shown as a separate component, storage system 6 may be embedded or included in memory device 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2:
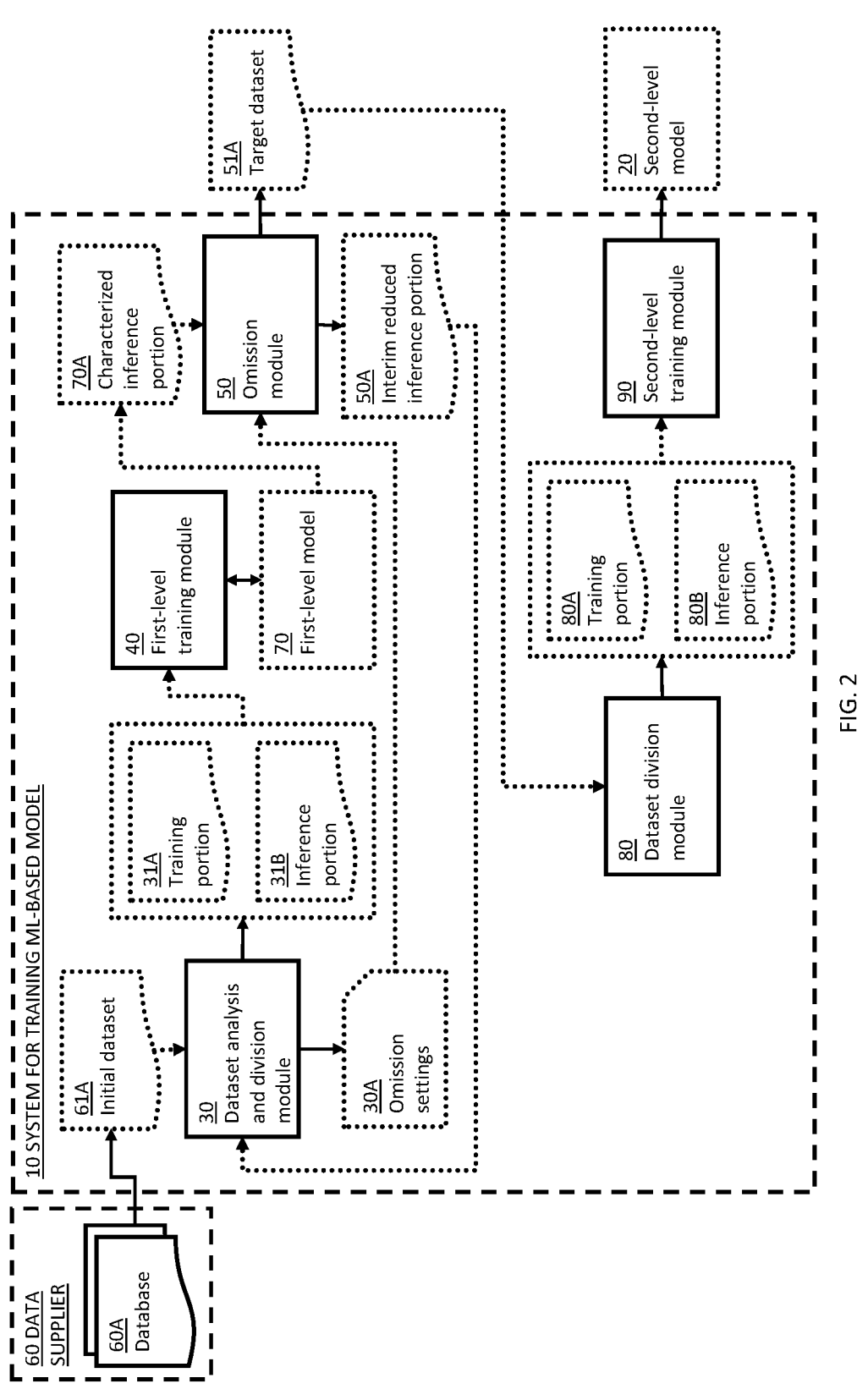
FIG. 2 is a block diagram, depicting a system for training ML-based model, according to some embodiments.

Reference is now made to FIG. 2, which depicts the system 10 for training ML-based model, according to some embodiments.

According to some embodiments of the invention, system 10 may be implemented as a software module, a hardware module, or any combination thereof. For example, system 10 may be or may include a computing device such as element 1 of FIG. 1. Furthermore, system 10 may be adapted to execute one or more modules of instruction code (e.g., element 5 of FIG. 1) to request, receive, analyze, calculate and produce various data. As further described in detail herein, system 10 may be adapted to execute one or more modules of instruction code (e.g., element 5 of FIG. 1) in order to evaluate an expected contribution of each data sample of an annotated dataset into a following training process, calculate at least one characteristic of a data sample, omit a subset of data samples based on the characteristic, and train the ML-based model etc.

As shown in FIG. 2, arrows may represent flow of one or more data elements to and from system 10 and/or among modules or elements of system 10. Some arrows have been omitted in FIG. 2 for the purpose of clarity.

In some embodiments, system 10 may be logically divided into two levels: the first level, directed to ML data preprocessing (e.g., fixing imbalanced data issue), and the second level, directed to training ML-based target model (ML-based second-level model 20) based on preprocessed data of the first level.

In some embodiments, the first level of system 10 may include the following modules of instruction code (e.g., instruction code 5 of computing device 1, as shown in FIG. 1): dataset analysis and division module 30, first-level training module 40 and omission module 50.

Dataset analysis and division module 30 may be configured to request and receive an initial dataset 61A, e.g., extracted from database 60A provided by third-party data supplier 60.

Initial dataset 61A may include a plurality of annotated data samples. The annotated data samples may include annotations providing associations of the data samples with a plurality of classes, as it is usually done in supervised or semi-supervised machine learning practices. Initial dataset 61A may have various structure and content depending on specific ML task that is to be solved (e.g., speech recognition, email spam detection, plant species classification etc.). The purpose of the claimed invention is not constrained by specific structure or content of annotated datasets, and since such annotated datasets are considered to be a common aspect of machine learning, it will be clear for the one of ordinary skill in the art what structure or content they may have.

In some embodiments, dataset analysis and division module 30 may be further configured to analyze received initial dataset 61A in order to determine whether it has imbalanced data issue, i.e., whether it has significantly unequal distribution of data samples between the classes. Dataset analysis and division module 30 may be further configured to choose at least one class of the plurality of classes (for example, a majority class), based on the amount of data samples associated with each class in the initial dataset 61A, determined in result of the analysis.

Dataset analysis and division module 30 may be further configured to calculate, for the chosen at least one class (e.g., the majority class), an omission percentage. The omission percentage may represent percentage of data samples that have to be omitted from the initial dataset 61A in order to equalize distribution of data samples between the classes.

Dataset analysis and division module 30 may be further configured to generate omission settings 30A, including information about the chosen at least one class and the calculated omission percentage.

Dataset analysis and division module 30 may be further configured to divide the initial dataset 61A into a training portion 31A of data samples and an inference portion 31B of data samples. In some embodiments, this division may be performed by having a random ratio of the data samples of each class of the plurality of classes in the training portion 31A or in the inference portion 31B. In some alternative embodiments, the said ratio may be predetermined. In yet another alternative embodiments, dataset analysis and division module 30 may be additionally configured to calculate said ratio, e.g., as a function of such ratio in initial dataset 61A, if considered as a whole. A ratio of sizes of training portion 31A and inference portion 31B may also be various, e.g., 70% for training portion 31A and 30% for inference portion 31B, as it is used commonly.

In some embodiments, first-level training module 40 may be configured to train at least one ML-based first-level model (e.g., first-level model 70) to perform a first-level task, based on initial dataset 61A.

Therefore, in some embodiments, first-level training module 40 may be configured to receive training portion 31A and inference portion 31B. First-level training module 40 may be further configured to train the at least one ML-based first-level model (e.g., first-level model 70) to perform the first-level task, based on the training portion (e.g., training portion 31A). First-level training module 40 may be further configured to infer the at least one trained ML-based first-level model (e.g., first-level model 70) on the inference portion (e.g., inference portion 31B) to perform the first-level task, based on the training of the at least one ML-based first-level model (e.g., first-level model 70).

In some embodiments, first-level training module 40 may be further configured to calculate, based on training the at least one ML-based first-level model (e.g., first-level model 70), at least one characteristic, representing, for each data sample, a value of contribution into a following training of the ML-based second-level model (e.g., second-level model 20) to perform a second-level task. Hence, in result of the inferring, first-level model 70 may be configured to output characterized inference portion 70A of data samples, which includes data samples of inference portion 31B accompanied with values of the said calculated characteristic.

In some embodiments, omission module 50 may be configured to receive characterized inference portion 70A and omission settings 30A. Omission module 50 may be further configured to select a subset of data samples from the characterized inference portion 70A based on the set of omission conditions, including selection of the data samples up to the calculated omission percentage and an association of the selected data samples with the chosen at least one class (e.g., the majority class), as specified by omission settings 30A.

Omission module 50 may be further configured to omit the subset of data samples from characterized inference portion 70A of initial dataset 61A based on the at least one characteristic, specified in characterized inference portion 70A. Omission module 50 may be further configured to obtain target dataset 51A which is a part of initial dataset 61A, remained after the omission. Obtained target dataset 51A may be further used in the processes of the second level of system 10, as further described herein, or be transferred to and used by third-party systems.

In some embodiments, system 10 may be configured to perform training the at least one ML-based first-level model (e.g., first-level model 70) by first-level training module 40, calculating the at least one characteristic by first-level training module 40, and omitting the subset of data samples from characterized inference portion 70A by omission module 50 iteratively. Depending on specific embodiments, all three processes (said training, calculating and omitting) together, or separately or in any combination thereof may be included in iterative processes. It should be understood that, in such embodiments, any of said processes of training, calculating and omitting may provide interim results at interim iterations of an iterative process and final (target) results at the final iteration.

In particular, dataset analysis and division module 30 may be configured to divide the calculated omission percentage into interim omission percentages, so as to distribute omission process proportionally to a number of iterations and to get a required number of data samples omitted overall. Dataset analysis and division module 30 may be further configured to generate omission settings 30A, including information about the calculated omission percentage of data samples to be omitted overall as well as omission percentages of data samples to be omitted at each iteration. Omission module 50 may be further configured to select the subset of data samples from the characterized inference portion 70A based on the set of omission conditions, including selection of the data samples up to the calculated interim omission percentages, as specified by omission settings 30A. Omission module 50 may be further configured to omit the subset of data samples from characterized inference portion 70A of initial dataset 61A and to obtain interim reduced inference portion 50A, according to each interim iteration. In the following iteration, dataset analysis and division module 30 may be further configured to receive interim reduced inference portion 50A of the previous iteration and substitute inference portion 31B of the previous iteration with the interim reduced inference portion 50A, thereby achieving an interim reduced initial dataset (not designated in figures).

Dataset analysis and division module 30 may be further configured to perform, at each interim iteration, a random division of the interim reduced initial dataset into a training portion 31A of data samples and an inference portion 31B of data samples. Consequently, at each iteration, first-level model 70 is trained and inferred on respective portions of data samples, having combinations of data samples that vary from one iteration to another. Hence, an additional technical effect may be provided by achieving more reliable selection and omission of data samples of initial dataset 61A overall.

It should be understood that said iterative processes are not limited by incorporation of said training, calculating and omitting only. Said iterative processes may thus additionally include other processes, either related to the purpose of the claimed invention or not.

In some embodiments, the second level of system 10 may include the following modules of instruction code (e.g., instruction code 5 of computing device 1, as shown in FIG. 1): dataset division module 80 and second-level training module 90.

In some embodiments, dataset division module 80 may be configured to receive target dataset 51A. Dataset division module 80 may be further configured to divide target dataset 51A into training portion 80A of data samples and inference portion 80B of data samples.

In some embodiments, second-level training module 90 may be configured to train ML-based second-level model (e.g., second-level model 20), to perform the second-level task, based on target dataset 51A.

More specifically, second-level training module 90 may be configured to receive training portion 80A and inference portion 80B. Second-level training module 90 may be further configured to train the ML-based second-level model (e.g., second-level model 20) to perform the second-level task, based on the training portion (e.g., training portion 80A) of target dataset 51A. Second-level training module 90 may be further configured to infer the trained ML-based second-level model (e.g., second-level model 20) on the inference portion (e.g., inference portion 80B) of target dataset 51A to perform the second-level task, based on said training of the ML-based second-level model (e.g., second-level model 20). By said inferring, the performance of the second-level model (e.g., second-level model 20) may be evaluated.

It should be apparent to the one of ordinary skill in the art that the present invention is not limited by incorporation neither of specific types of ML-based models (e.g., Convolutional Neural Network (CNN), Multilayer Perceptron, Naive Bayes algorithm, Support Vector Machine (SVM) algorithm etc.), nor of specific known ML methods (e.g., reinforcement learning, backpropagation, stochastic gradient descent (SGD) etc.) and nor of specific ML tasks (classification, regression, clustering etc.).

The essence of the invention may be generalized by the idea of utilizing machine learning techniques to optimize annotated dataset for its further utilization in the following machine learning process. More specifically, the essence of the invention is based on the idea that training a certain ML-based model (e.g., first-level model 70) based on some dataset (e.g., initial dataset 61A) may provide specific information, characterizing data samples of this dataset in respect of their expected contribution in or usefulness for training of another ML-based model (e.g., second-level model 20).

Hence, it should be understood that rather the combination of these models (e.g., first-level model 70 and second-level model 20) itself is essential for the purpose of the claimed invention than any specific implementation of this combination, explicitly defining each or any of utilized ML-based models. Accordingly, the specific implementation of the combination of ML-based models may vary from an extrapolated example where first-level model 70 and second-level model 20 are the same to an example where they are completely different or even where an ensemble of different first-level models 70 is used.

Figures 3A, 3B:
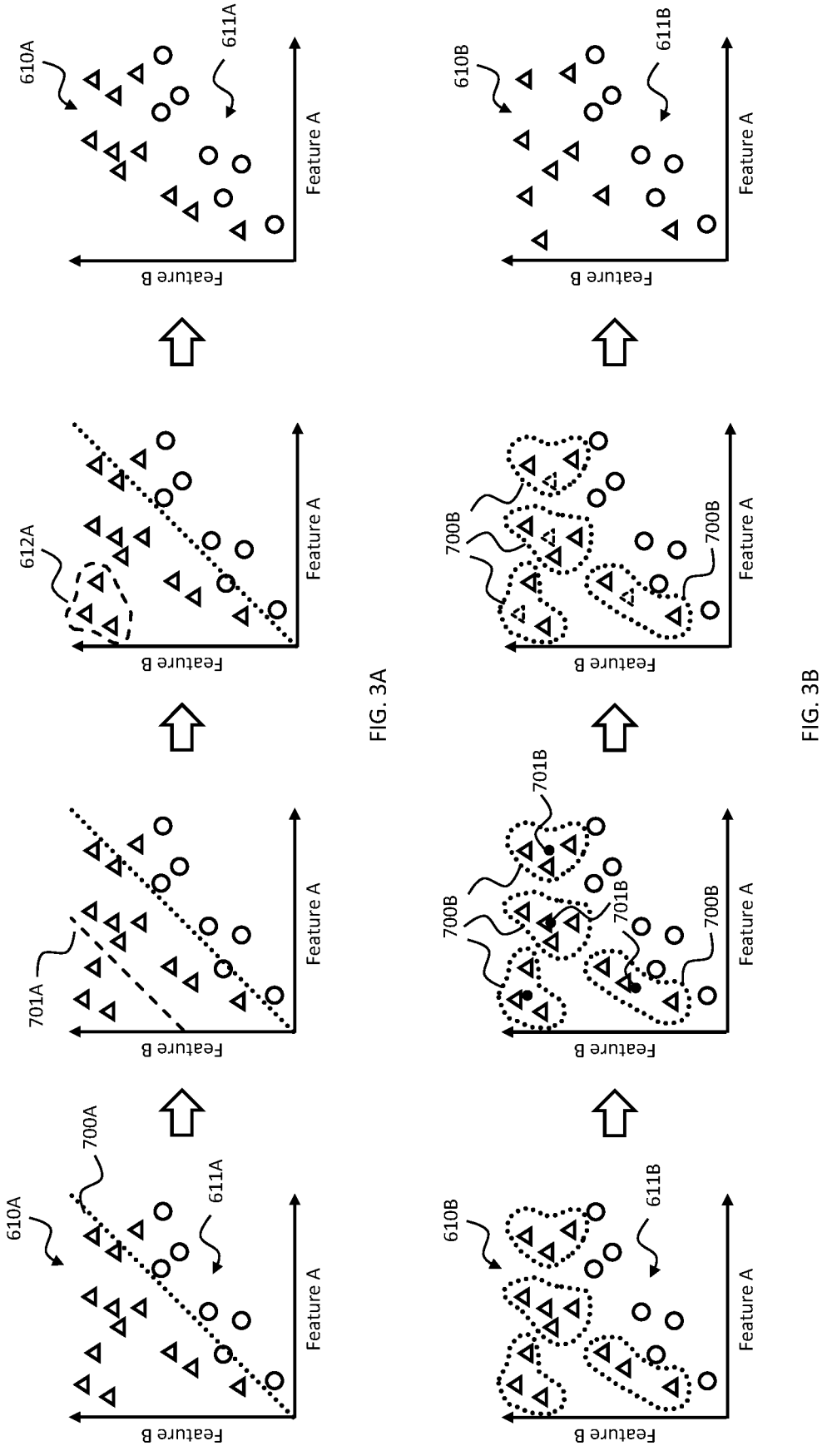
FIGS. 3A-3C are series of diagrams, depicting examples of selection and omission of a subset of data samples from an inference portion of a training dataset, according to some alternative embodiments.
Figure 3C:
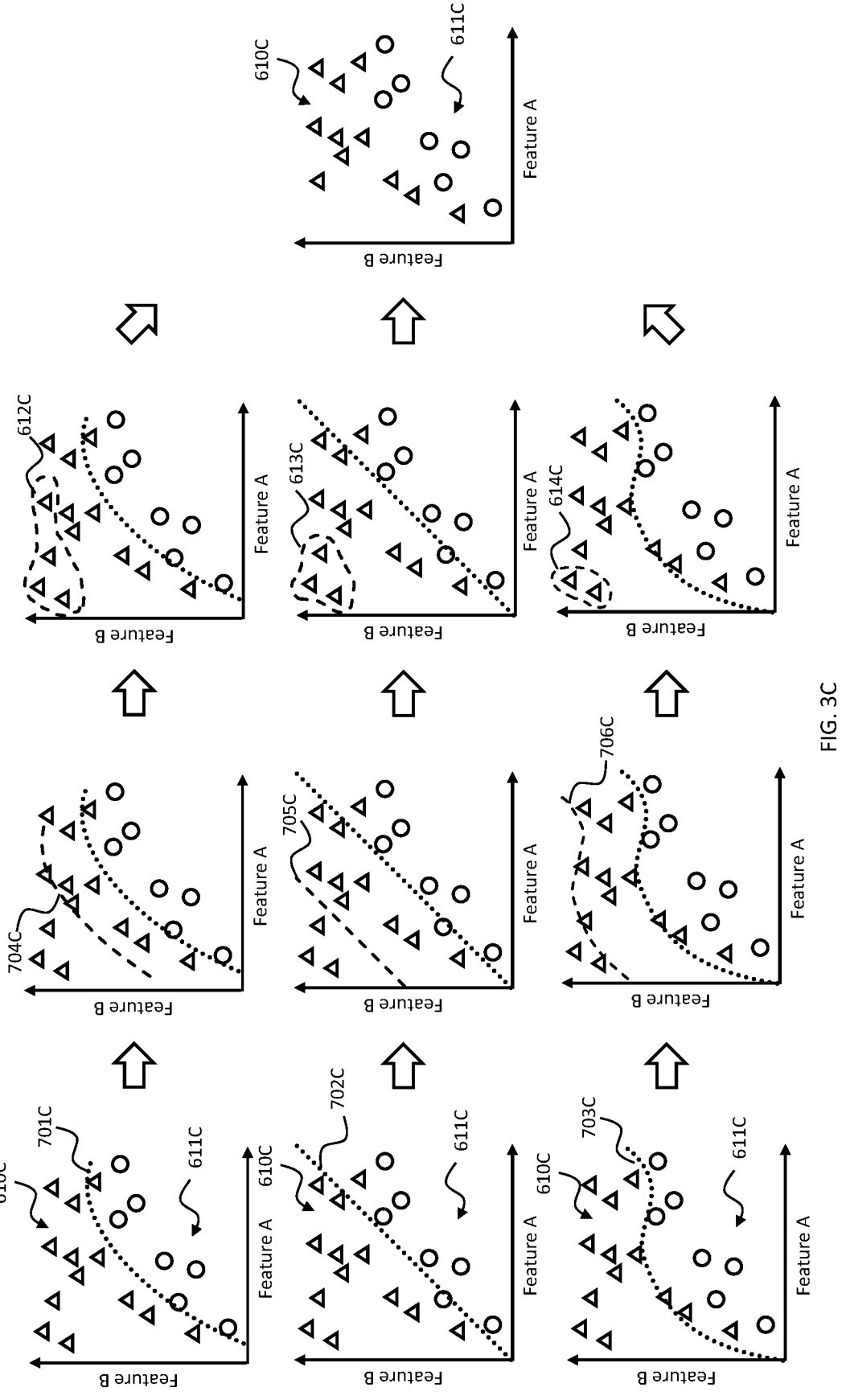

However, in order to make this description sufficiently illustrative and non-abstract, the invention is further described in detail by providing three alternative non-exclusive embodiments, described in detail with references to FIGS. 3A-3C respectively.

FIGS. 3A-3C include series of diagrams, depicting examples of selection and omission of subsets of data samples from an inference portion (e.g., inference portion 31B) of initial dataset 61A, according to respective alternative embodiments. Said diagrams depict distribution of data samples of inference portion 31B in the feature space, defined by features A and B.

According to annotations provided in initial dataset 61A, data samples are divided into two classes: the first class 610A (or 610B, or 610C respectively) is marked by triangles and the second class 611A (or 611B, or 611C respectively) is marked by circles. As can be seen, class 610A (or 610B, or 610C respectively) includes significantly larger number of data samples than class 611A (or 611B, or 611C respectively), hence it may be chosen by data analysis and division module 30 as the majority class that requires omission of certain percentage of data samples in order to fix data imbalance issue.

The first specific embodiment is further described with the reference to FIG. 3A.

According to the first specific embodiment, first-level model 70 may be a classification model and the first-level task may include classification of the data samples of initial dataset 61A according to the plurality of classes (e.g., classes 610A and 611A). In result of first-level model 70 training, first-level training module 40 may be configured to calculate decision boundary 700A, which is illustrated in the series of diagrams. Decision boundary 700A may define the division of the feature space into classes as it may be done by trained first-level model 70.

In this embodiment, second-level model 20 may be a classification model as well. The second-level task may include classification of data samples of an incoming dataset according to the plurality of classes (e.g., classes 610A and 611A).

In the first specific embodiment, first-level training module 40 may be configured to calculate the said at least one characteristic, wherein the characteristic comprises a confidence value representing, in result of the inferring of first-level model 70, a pertinence of the one or more data samples of the inference portion 31B with their respective associated classes (e.g., classes 610A and 611A). In respect of the provided diagrams, it should be understood that the father the specific data sample is located from the decision boundary 700A, the higher confidence value it gets in result of the inferring.

In the first specific embodiment, omission module 50 may be further configured to select the subset (e.g., subset 612A) of data samples from inference portion 31B based on the set of omission conditions, including an association of the selected data samples with the chosen at least one class (e.g., class 610A, as specified by omission settings 30A) in result of the inferring; and a selection of the data samples based on the calculated confidence value. More specifically, omission module 50 may be further configured to select the data samples having (a) a highest-scoring confidence value, and (b) a confidence value that surpasses a predefined threshold (e.g., threshold 701A illustrated by line located at certain distance from decision boundary 700A). In some embodiments, dataset analysis and division module 30 may be configured to predefine (either manually or automatically) the said threshold 701A and include information about it into omission settings 30A.

Hence, as can be seen in the series of diagrams, omission module 50 selects subset 612A including three data samples, which are selected because they pertain to chosen majority class 610A; are located farther with respect to decision boundary 700A compared to the others; and are located above threshold 701A. The last diagram in the series represents a content of a reduced inference portion, formed in result of omission of subset 612A by omission module 50. The reduced inference portion is further included in target dataset 51A.

As can be seen, this particular embodiment may assume that data samples having the highest confidence value calculated during training of certain classification model (e.g., first-level model 70) have insignificant influence on training the ability of another classification model (e.g., second-level model 20) to classify incoming data samples by classes (e.g., classes 610A and 611A).

The second specific embodiment is further described with the reference to FIG. 3B.

According to the second specific embodiment, first-level model 70 may be a clustering model. First-level task may include clustering of the chosen at least one class (e.g., majority class 610B) and forming, in result of clustering, a set of clusters 700B of data samples which are associated with the chosen at least one class (e.g., class 610B). First-level training module 40 may be configured to calculate, in result of inferring of first-level model 70, location of centroids 701B of clusters 700B in the feature space.

In this embodiment, second-level model 20 may be a classification model. The second-level task may include classification of data samples of an incoming dataset according to the plurality of classes (e.g., classes 610B and 611B).

In the second specific embodiment, first-level training module 40 may be configured to calculate the said at least one characteristic, wherein the characteristic comprises a distance of the one or more data samples of inference portion 31B from a centroid of a cluster (e.g., centroid 701B of respective cluster 700B) of the set of clusters to which the one or more data samples pertain, in result of the inferring of first-level model 70.

In the second specific embodiment, omission module 50 may be further configured to select the subset of data samples from inference portion 31B based on the set of omission conditions, including selection of the data samples based on the calculated distance. More specifically, omission module 50 may be further configured to select the data samples having (a) a shortest distance to the centroid of the cluster to which they pertain, (b) a distance that is lower than predefined threshold (not shown in figures). In some embodiments, dataset analysis and division module 30 may be configured to predefine (either manually or automatically) the said threshold and include information about it into omission settings 30A. In the illustrated example, the selected data samples are marked by having dash-type contour line.

Hence, as can be seen in the series of diagrams, omission module 50 selects the subset including four data samples (one from each cluster 700B), which are selected because they are located closer to respective centroids 701B of clusters 700B compared to the others; and respective distances to centroids 701B are lower than predefined threshold. The last diagram in the series represents a content of a reduced inference portion, achieved in result of omission of the subset by omission module 50. The reduced inference portion is further included in target dataset 51A.

As can be seen, this particular embodiment may assume that data samples having the shortest distance to centroid 701B of cluster 700B to which they pertain are the most easy-to-define members of respective cluster and, consequently, of the majority class (e.g., class 610A) overall. Hence, such data samples have insignificant influence on training the ability of classification model (e.g., second-level model 20) to classify incoming data samples by classes (e.g., classes 610A and 611A). As it can be seen in final diagram in the series of FIG. 3B, the reduced inference portion has more even distribution of data samples in the feature space than inference portion 31B.

In yet another alternative embodiment, omission module 50 may be configured to determine, for at least one cluster (e.g., for at least one cluster 700B), a range of distances to centroid 701B of respective cluster, corresponding to the densest distribution of the data samples in respective cluster 700B. Omission module 50 may be further configured to select at least one data sample having the distance from the determined range. In other words, in such embodiment, the selection of data samples for further omission is made from the regions of feature space having the densest distribution of the data samples.

This particular embodiment may assume that density of data samples distribution in the feature space don't make significant contribution into training the ability of some classification model (e.g., second-level model 20) to classify incoming data samples by classes (e.g., classes 610B and 611B). Hence, with respect to majority class (e.g., class 610B) reducing density, but keeping the variety of data samples distribution in the feature space, may be considered an effective approach to balancing data.

The third specific embodiment is described with the reference to FIG. 3C, including series of diagrams, depicting the third example of selection and omission of a subset of data samples from inference portion 31B of initial dataset 61A.

According to the third specific embodiment, system 10 includes a plurality of first-level models, e.g., three different first-level models 70. First-level training module 40 may be further configured to train a plurality of ML-based first-level models 70. Series of diagrams regarding each particular first-level model 70 are provided in separate rows respectively.

According to the third specific embodiment, first-level models 70 may be classification models and the first-level task may include classification of the data samples of initial dataset 61A according to the plurality of classes (e.g., classes 610C and 611C). First-level training module 40 may be further configured to calculate, in result of training of respective first-level models 70, decision boundaries 701C, 702C and 703C respectively. Decision boundaries 701C, 702C and 703C define the division of the feature space into classes as it may be done by respective first-level model 70 in result of training.

In this embodiment, second-level model 20 may be a classification model as well. The second-level task may include classification of data samples of an incoming dataset according to the plurality of classes (e.g., classes 610C and 611C).

In the third specific embodiment, first-level training module 40 may be configured to calculate the said at least one characteristic, wherein said characteristic comprises confidence values representing, in result of inferring of each first-level model 70, a pertinence of the one or more data samples of the inference portion 31B with their respective associated classes (e.g., classes 610C and 611C).

It should be understood that, in respect of the provided diagrams, the father the specific data sample is located from respective decision boundary 701C, 702C or 703C, the higher confidence value it gets in result of inferring.

In the third specific embodiment, in respect of each first-level model 70, omission module 50 may be further configured to select the subset (e.g., subset 612C, 613C and 614C respectively) of data samples from inference portion 31B based on a set of omission conditions. The set of omission conditions may include an association of the selected data samples with the chosen at least one class (e.g., majority class 610C, as specified by omission settings 30A) in result of inferring; and selection of the data samples based on the calculated confidence value. More specifically, in respect of each first-level model 70, omission module 50 may be further configured to select the data samples having (a) a highest-scoring confidence value, and (b) a confidence value that surpasses a predefined threshold (e.g., thresholds 704C, 705C and 706C illustrated by respective lines located at certain distance from respective decision boundaries 701C, 702C or 703C). In some embodiments, dataset analysis and division module 30 may be configured to predefine (either manually or automatically) said thresholds 704C, 705C and 706C and include information about them into omission settings 30A.

Omission module 50 may be further configured to finalize the selection of subset of data samples from inference portion 31B by resulting selection of the data samples based on a function of the calculated confidence values of specific data samples, in the plurality of first-level models 70. For example, omission module 50 may apply logical conjunction to subsets 612C, 613C and 614C and get resulting subset (not shown in figures), having only those data samples included, which appear in each of subsets 612C, 613C and 614C. It should be understood that the claimed invention is not limited to using only logical conjunction as the said function. Any other appropriate functions may be used in order to determine a resulting subset of data samples for further omission.

Hence, omission module 50 selects resulting subset including two data samples, which are selected because they pertain to chosen majority class 610C; are located farther with respect to decision boundaries 701C, 702C and 703C compared to the others; are located above respective thresholds 704C, 705C and 706C; and are included in each of selected subsets 612C, 613C and 614C. The last diagram in the series represents a content of a reduced initial portion achieved in result of omission of the resulting subset by omission module 50. The reduced inference portion is further included in target dataset 51A.

As can be seen, this particular embodiment may assume that data samples having the highest confidence values calculated during training of a plurality of classification models (e.g., first-level models 70) have insignificant influence on training the ability of another classification model (e.g., second-level model 20) to classify incoming data samples by classes (e.g., classes 610C and 611C).

Referring now to FIG. 4, a flow diagram is presented, depicting a method of training ML-based model, by at least one processor, according to some embodiments.

As shown in step S1005, the at least one processor (e.g., processor 2 of FIG. 1) may perform receiving an initial dataset (e.g., initial dataset 61A), including a plurality of annotated data samples, wherein the annotated data samples include annotations providing associations of the data samples with a plurality of classes (e.g., classes 610A and 611A). Step S1005 may be carried out by dataset analysis and division module 30 (as described with reference to FIGS. 2 and 3A-3C).

As shown in step S1010, the at least one processor (e.g., processor 2 of FIG. 1) may perform choosing at least one class of the plurality of classes (e.g., classes 610A and 611A), based on the amount of data samples associated with each class in the initial dataset (e.g., initial dataset 61A). Step S1010 may be carried out by dataset analysis and division module 30 (as described with reference to FIGS. 2 and 3A-3C).

As shown in step S1015, the at least one processor (e.g., processor 2 of FIG. 1) may perform calculating, for the chosen at least one class (e.g., class 610A), an omission percentage, representing percentage of data samples that are to be omitted from the initial dataset (e.g., initial dataset 61A). Step S1015 may be carried out by dataset analysis and division module 30 (as described with reference to FIGS. 2 and 3A-3C).

As shown in step S1020, the at least one processor (e.g., processor 2 of FIG. 1) may perform division of the initial dataset (e.g., initial dataset 61A) into a training portion (e.g., training portion 31A) of data samples and an inference portion (e.g., inference portion 31B) of data samples, wherein the division is performed by having a random ratio of the data samples of each class of the plurality of classes (e.g., classes 610A and 611A) in the training portion (e.g., training portion 31A) or in the inference portion (e.g., inference portion 31B). Step S1020 may be carried out by dataset analysis and division module 30 (as described with reference to FIGS. 2 and 3A-3C).

As shown in step S1025, the at least one processor (e.g., processor 2 of FIG. 1) may perform training of the at least one ML-based first-level model (e.g., first-level model 70) to perform the first-level task, based on the training portion (e.g., training portion 31A). Step S1025 may be carried out by first-level training module 40 (as described with reference to FIGS. 2 and 3A-3C).

As shown in step S1030, the at least one processor (e.g., processor 2 of FIG. 1) may perform inferring of the at least one trained ML-based first-level model (e.g., first-level model 70) on the inference portion (e.g., inference portion 31B) to perform the first-level task, based on the training of the at least one ML-based first-level model (e.g., first-level model 70). Step S1030 may be carried out by first-level training module 40 (as described with reference to FIGS. 2 and 3A-3C).

As shown in step S1035, the at least one processor (e.g., processor 2 of FIG. 1) may perform calculating of at least one characteristic, representing, for each data sample, a value of contribution into a training of a ML-based second-level model (e.g., second-level model 20) to perform a second-level task. Step S1035 may be carried out by first-level training module 40 (as described with reference to FIGS. 2 and 3A-3C).

As shown in step S1040, the at least one processor (e.g., processor 2 of FIG. 1) may perform omission of a subset of data samples (e.g., subset 612A) from the initial dataset based on the at least one characteristic, to obtain a target dataset (e.g., target dataset 51A), wherein the subset of data samples (e.g., subset 612A) is selected from the inference portion (e.g., characterized inference portion 70A) based on the set of omission conditions, including an association of the selected data samples with the chosen at least one class (e.g., class 610A) in result of inferring; and selection of the data samples up to the calculated omission percentage. Step S1040 may be carried out by omission module 50 (as described with reference to FIGS. 2 and 3A-3C).

As shown in step S1045, the at least one processor (e.g., processor 2 of FIG. 1) may perform training of ML-based second-level model (e.g., second-level model 20), to perform the second-level task, based on the target dataset (e.g., target dataset MA). Step S1045 may be carried out by second-level training module 90 (as described with reference to FIGS. 2 and 3A-3C).

As can be seen from the provided description, the claimed invention represents a system and method of training ML-based model, which incorporate the improved process of balancing training dataset, thereby increasing training dataset quality and, consequently, increasing reliability of trained ML-based model performance. More specifically, the claimed invention includes a data balancing method that provides omission of data samples based on evaluation of their expected contribution into the following training process.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of training a machine-learning (ML)-based model by at least one processor, the method comprising:

receiving, by the processor, an initial dataset comprising a plurality of digitally stored annotated data samples each associated with at least one class label;

automatically dividing, by a dataset-analysis module executed by the processor, the initial dataset into a training portion and an inference portion according to class-balance parameters;

training, by a first-level ML-based model implemented on the processor, using the training portion, to perform a first-level classification task;

inferring, by the trained first-level ML-based model, on the inference portion to generate quantitative contribution metrics for each data sample, each metric representing the expected contribution of that sample to accuracy of a second-level ML model;

executing, by an omission module, an automated computation that selects and omits, from the inference portion, a subset of data samples whose contribution metrics satisfy a predefined omission condition comprising (i) association with a majority class and (ii) confidence value exceeding a threshold, thereby generating a target dataset;

iteratively repeating, by the processor, the training, inferring, and omitting operations across multiple iterations with dynamically updated omission percentages until a convergence criterion on dataset balance or model accuracy is met; and training, by the processor, a second level ML-based model on the resulting target dataset to perform a second-level predictive task with improved classification accuracy relative to training on the unbalanced dataset, wherein the iterative automated omission and retraining process implemented by the modules improves training-dataset quality and thereby enhances reliability and computation performance of the ML-based model.

2. The method of claim 1, wherein the digitally stored annotated data samples received by the processor further comprise at least one class label selected based on the amount of data samples associated with each class in the initial dataset.

3. The method of claim 2, wherein training the first-level ML-based model comprises:

dividing the initial dataset into a training portion of data samples and an inference portion of data samples;

training the first-level ML-based model to perform the first-level classification task, based on the training portion;

inferring the first-level ML-based model on the inference portion to perform the first-level task, based on the training of the at least one ML-based first-level model.

4. The method of claim 3, wherein the division of the initial dataset into the training portion of data samples and the inference portion of data samples is performed by having a random ratio of the data samples of each class of a plurality of classes in the training portion or in the inference portion.

5. The method of claim 3, wherein the first-level classification task comprises classification of the data samples of the initial dataset according to a plurality of classes;

the quantitative contribution metrics comprises a confidence value representing, in result of the inferring, a pertinence of one or more data samples of the inference portion with their respective associated classes; and wherein the method further comprises selecting a subset of data samples from the inference portion based on a set of omission conditions, said omission conditions comprising (i) an association of the selected data samples with the selected at least one class in result of inferring, and (ii) a selection of the data samples based on the computed confidence value.

6. The method of claim 5, wherein the selection of the data samples based on the computated confidence value comprises the selection of the data samples having (a) a highest-scoring confidence value, and (b) a confidence value that surpasses a predefined threshold.

7. The method of claim 5, wherein training at least one first-level ML-based model comprises training a plurality of first-level ML-based models; and the selection of the data samples based on the computed confidence value comprises a selection of the data samples based on a function of the computed confidence values of specific data samples, in the plurality of first-level models.

8. The method of claim 3, wherein the first-level task comprises clustering the selected at least one class label and forming, in result of clustering, a set of clusters of the data samples which are associated with the selected at least one class label;

the at least one characteristic comprises a distance of the one or more data samples from a centroid of a cluster of the set of clusters to which the one or more data samples pertain, in result of the inferring; and wherein the method further comprises selecting a subset of data samples from the inference portion based on a set of omission conditions, said omission conditions comprising selection of the data samples based on the distance.

9. The method of claim 8, wherein the selection of the data samples based on the distance comprises selection of the data samples having (a) a shortest distance to the centroid of the cluster to which the one or more data samples pertain, (b) a distance that is lower than predefined threshold.

10. The method of claim 8, wherein the selection of the data samples based on the distance comprises, for at least one cluster, determination of a range of distances corresponding to a densest distribution of the data samples in the cluster; and selection of at least one data sample having the distance from the determined range.

11. The method of claim 3, wherein the second-level predictive task comprises classification of data samples of an incoming dataset according to a plurality of classes.

12. The method of claim 3, wherein the method further comprises for the selected at least one class, calculating an omission percentage, representing percentage of data samples that are to be omitted from the initial dataset; and selecting a subset of data samples from the inference portion based on a set of omission conditions, comprising selection of the data samples up to the calculated omission percentage.

13. A system for training an ML-based model, the system comprising: a non-transitory memory device, wherein modules of instruction code are stored, and at least one processor associated with the memory device, and configured to execute the modules of instruction code, whereupon execution of said modules of instruction code, the at least one processor is configured to:

receive, by the processor, an initial dataset comprising a plurality of digitally stored annotated data samples each associated with at least one class label;

automatically divide, by a dataset-analysis module executed by the processor, the initial dataset into a training portion and an inference portion according to class-balance parameters;

train, by a first-level ML-based model implemented on the processor, using the training portion, to perform a first-level classification task;

infer, by the trained first-level ML-based model, on the inference portion to generate quantitate contribution metrics for each data sample, each metric representing the expected contribution of that sample to accuracy of a second-level ML model;

execute, by an omission module, an automated computation that selects and omits, from the inference portion, a subset of data samples whose contribution metrics satisfy a predefined omission condition comprising (i) association with a majority class and (ii) confidence value exceeding a threshold, thereby generating a target dataset;

iteratively repeat, by the processor, the training, inferring, and omitting operations across multiple iterations with dynamically updated omission percentages until a convergence criterion on dataset balance or model accuracy is met; and train, by the processor, a second level ML-based model on the resulting target dataset to perform a second-level predictive task with improved classification accuracy relative to training on the unbalanced dataset, wherein the iterative automated omission and retraining process implemented by the modules improves training-dataset quality and thereby enhances reliability and computation performance of the ML-based model.

14. The system of claim 13, wherein the digitally stored annotated data samples received by the processor further comprise at least one class label selected, based on the amount of data samples associated with each class in the initial dataset.

15. The system of claim 14, wherein the at least one processor is configured to train the first-level ML-based model by:

dividing the initial dataset into a training portion of data samples and an inference portion of data samples;

training the first-level ML-based model to perform the first-level classification task, based on the training portion;

inferring the first-level ML-based model on the inference portion to perform the first-level task, based on the training of the at least one ML-based first-level model.

16. The system of claim 15, wherein the first-level classification task comprises classification of the data samples of the initial dataset according to a plurality of classes;

the quantitative contribution metrics comprises a confidence value representing, in result of the inferring, a pertinence of one or more data samples of the inference portion with their respective associated classes; and wherein the at least one processor is configured to select a subset of data samples from the inference portion based on a set of omission conditions, said omission conditions comprising (i) an association of the selected data samples with the selected at least one class in result of inferring, and (ii) a selection of the data samples based on the computed confidence value.

17. The system of claim 16, wherein the at least one processor is configured to select the data samples based on the computed confidence value as having (a) a highest-scoring confidence value, and (b) a confidence value that surpasses a predefined threshold.

18. The system of claim 16, wherein the at least one first-level ML-based model comprises a plurality of first-level ML-based models; and the selection of the data samples based on the computed confidence value comprises a selection of the data samples based on a function of the computed confidence values of specific data samples, in the plurality of first-level ML-based models.

19. The system of claim 15, wherein the first-level task comprises clustering the selected at least one class label and forming, in result of clustering, a set of clusters of the data samples which are associated with the selected at least one class label;

the at least one characteristic comprises a distance of the one or more data samples from a centroid of a cluster of the set of clusters to which the one or more data samples pertain, in result of the inferring; and wherein the at least one processor is further configured to:

select a subset of data samples from the inference portion based on a set of omission conditions, said omission conditions comprising selection of the data samples based on the distance.

* * * * *